United States Patent
Toksoz et al.

(10) Patent No.: US 11,607,615 B2
(45) Date of Patent: Mar. 21, 2023

(54) SYSTEMS AND METHODS FOR PROVIDING MULTI-PART PERSISTENT CONTENT

(71) Applicant: GOOGLE LLC, Mountain View, CA (US)

(72) Inventors: Tuna Toksoz, Mountain View, CA (US); John Dukellis, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/975,362

(22) PCT Filed: Nov. 2, 2018

(86) PCT No.: PCT/US2018/058978
§ 371 (c)(1),
(2) Date: Aug. 24, 2020

(87) PCT Pub. No.: WO2020/091811
PCT Pub. Date: May 7, 2020

(65) Prior Publication Data
US 2021/0069596 A1 Mar. 11, 2021

(51) Int. Cl.
*G06F 9/445* (2018.01)
*H04L 29/08* (2006.01)
(Continued)

(52) U.S. Cl.
CPC .............. *A63F 13/71* (2014.09); *A63F 13/35* (2014.09); *H04L 63/0876* (2013.01);
(Continued)

(58) Field of Classification Search
CPC ........ A63F 13/352; A63F 13/69; A63F 13/77; G06F 8/61; G06Q 30/0209; G07F 17/3225; G07F 17/3244
See application file for complete search history.

(56) References Cited

U.S. PATENT DOCUMENTS

| 8,662,997 B1 | 3/2014 | McCuller et al. |
| 2008/0065487 A1 | 3/2008 | Shea |

(Continued)

FOREIGN PATENT DOCUMENTS

| CN | 103685355 A | 3/2014 |
| JP | 2001-22588 A | 1/2001 |

(Continued)

OTHER PUBLICATIONS

Examination Report for IN Appln. Ser. No. 202027013026 dated Jun. 5, 2021 (6 pages).
International Preliminary Report on Patentability, Ch. I, for PCT Appln. Ser. No. PCT/US2018/058978 dated May 14, 2021 (10 pages).
Notice of Reasons for Rejection for Japanese Application No. 2020-519986, dated Aug. 2, 2021.
(Continued)

*Primary Examiner* — Lawrence S Galka
(74) *Attorney, Agent, or Firm* — Marshall, Gerstein & Borun LLP

(57) ABSTRACT

The systems and methods discussed herein enable providing multi-part persistent content that may maintain a state across multiple presentations, including via different applications. In one such implementation, a first portion of a content item, such as a first level of a video game, may be provided to a client device, and the client device may interact with the game. An identification of a state of the game or completion of the first portion may be provided to a content server, which may store an association of the device or user with the execution state. At a subsequent time, a second portion of the content item, such as a second level of the game, may be provided to the client device, based on the stored association. This can prevent the repetitive transmission of the same content, thereby reducing use of computational and bandwidth resources.

20 Claims, 4 Drawing Sheets

(51) Int. Cl.
  *A63F 13/71* (2014.01)
  *A63F 13/35* (2014.01)
  *H04L 9/40* (2022.01)
  *H04N 21/258* (2011.01)
  *H04N 21/478* (2011.01)
  *H04N 21/6334* (2011.01)
  *H04N 21/81* (2011.01)
  *H04L 67/01* (2022.01)

(52) U.S. Cl.
  CPC ....... *H04L 67/01* (2022.05); *H04N 21/25816* (2013.01); *H04N 21/4781* (2013.01); *H04N 21/6334* (2013.01); *H04N 21/8166* (2013.01)

(56) References Cited

U.S. PATENT DOCUMENTS

2016/0110747 A1   4/2016   Nakai et al.
2016/0357544 A1*  12/2016  Lewallen ................. G06F 8/61

FOREIGN PATENT DOCUMENTS

| JP | 2003-345762 A | 12/2003 |
| JP | 2016-511464 A | 4/2016 |
| WO | WO-2014/208147 A1 | 12/2014 |
| WO | WO-2018/093354 A1 | 5/2018 |

OTHER PUBLICATIONS

First Office Action for Chinese Application No. 201880065518.X, dated Oct. 20, 2021.
International Search Report and Written Opinion for PCT Appln. Ser. No. PCT/US2018/058978 dated Jun. 26, 2019 (15 pages).
Examination Report for EP Appln. Ser. No. 18811985.3 dated Mar. 5, 2021 (7 pages).
Office Action for Korean Application No. 10-2020-7010070, dated Apr. 13, 2022.
Decision of Rejection for Japanese Application No. 2020-519986, dated Jun. 27, 2022.

* cited by examiner

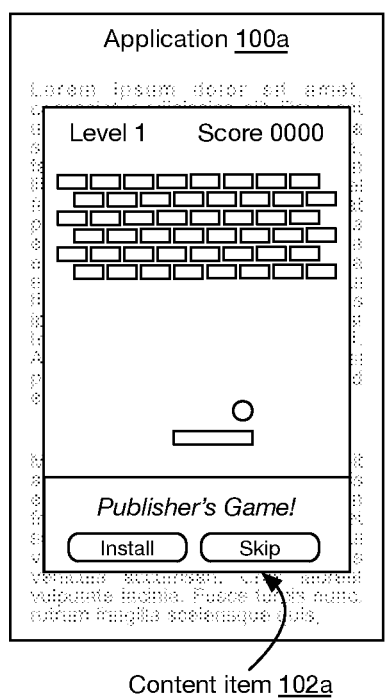
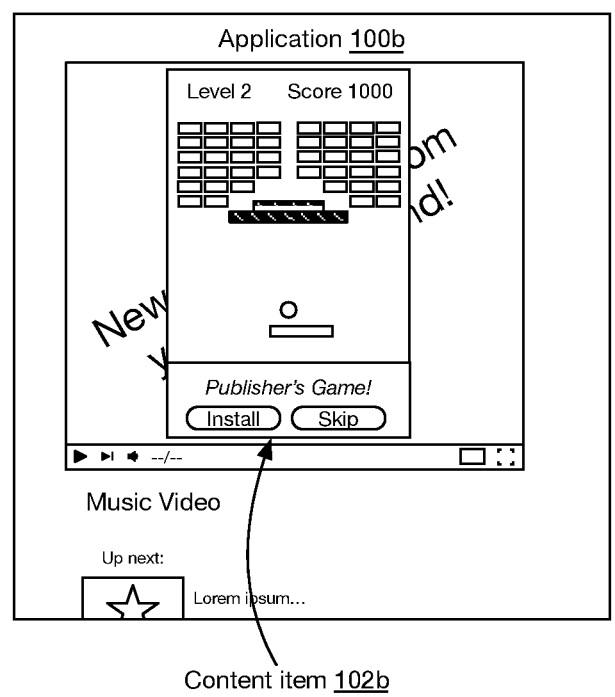
FIG. 1A
FIG. 1B

| Device ID 122 | Content ID 124 | State 126 |
|---|---|---|
| 0001 | 0001 | 0001 |
| 0001 | 0002 | 0005 |
| 0002 | 0001 | 0001 |
| 0003 | 0002 | 0002 |

SYSTEMS AND METHODS FOR PROVIDING MULTI-PART PERSISTENT CONTENT

RELATED APPLICATIONS

The present application claims the benefit of and priority to as a national stage application under 35 U.S.C. § 371 to International Patent Application No. PCT/US2018/058978, entitled "Systems and Methods for Providing Multi-Part Persistent Content," filed Nov. 2, 2018, the entirety of which is incorporated by reference herein.

BACKGROUND

Content items, such as interactive content or application previews, may be provided to client computing devices. However, such content items may be limited to single, self-contained items. While a content item may be presented multiple times to a user of a client computing device, this may increase user frustration or disengagement with the content item.

SUMMARY

The systems and methods discussed herein enable providing multi-part persistent content that may maintain a state across multiple presentations, including via different applications. In one such implementation, a first portion of a content item, such as a first level of a video game, may be provided to a client device, and the client device may interact with the game. An identification of a state of the game or completion of the first portion may be provided to a content server, which may store an association of the device or user with the execution state. At a subsequent time, a second portion of the content item, such as a second level of the game, may be provided to the client device, based on the stored association. This enables provisioning of the content item to a user based upon a user's actual interaction with the content item and can thereby prevent the need to retransmit the same content multiple times. This may therefore reduce computational and bandwidth resources used in the provision of the content item.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIGS. 1A and 1B are illustrations of an example of a multi-part persistent content item, according to some implementations;

FIG. 1C is an illustration of an example state association database, according to some implementations;

Like reference numbers and designations in the various drawings indicate like elements.

DETAILED DESCRIPTION

Figure 2:
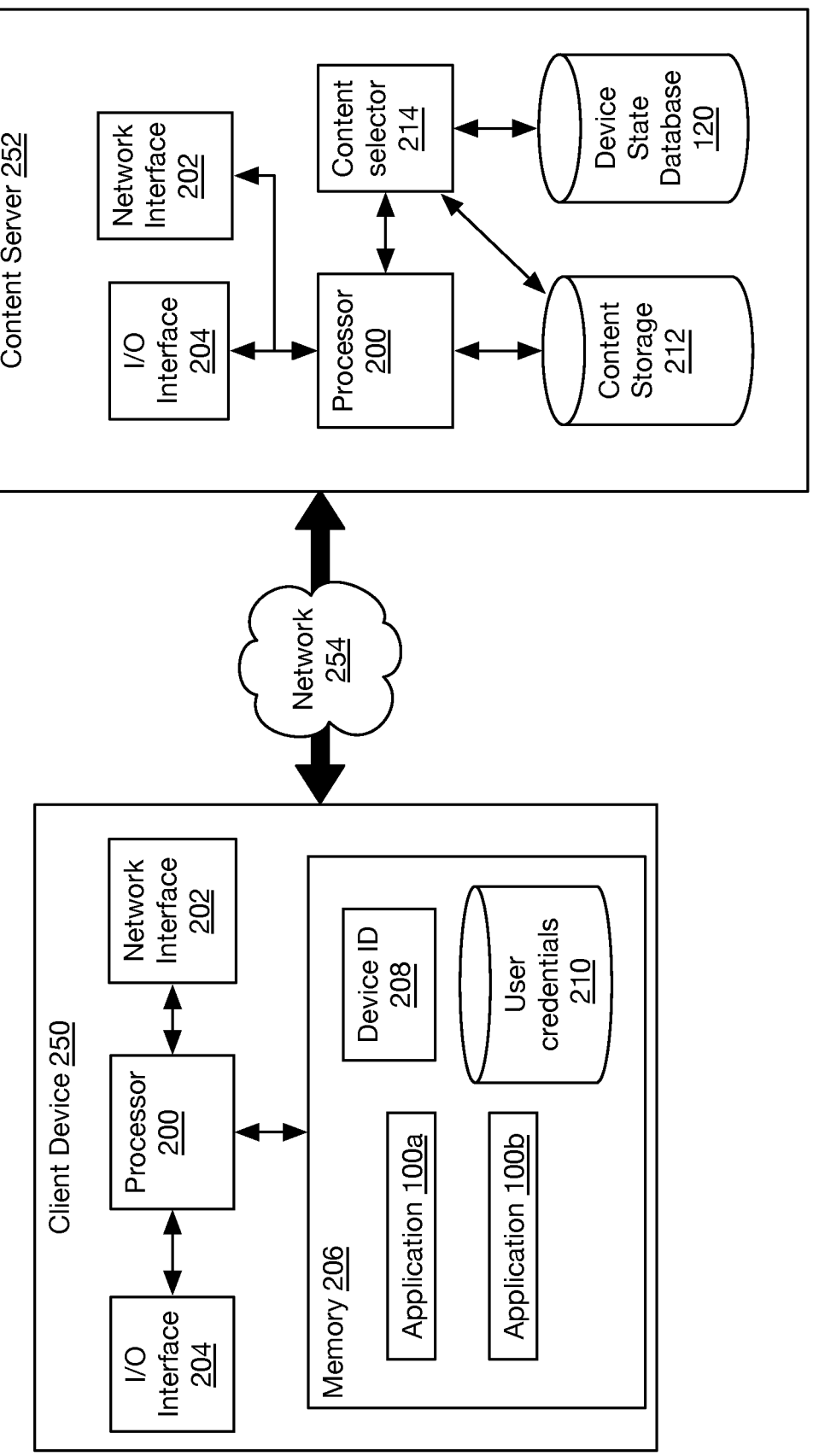
FIG. 2 is a block diagram illustrating implementations of computing devices for use with multi-part persistent content.

Content items, such as interactive content or application previews, may be provided to client computing devices. However, such content items may be limited to single, self-contained items. For example, a content item may include a preview of a simple interactive game, with an option to download or purchase the full game. However, the state of the game preview may not be saved between presentations of the preview, and on each new presentation, the user may have to restart from a starting level. While a content item may be presented multiple times to a user of a client computing device, this may increase user frustration or disengagement with the content item.

Nonetheless, publishers would like to engage multiple times with users, in a manner that keeps them interested and engaged with content. In an offline context, this may sometimes be accomplished via token-based games in which customers receive a token for each purchase, and must match sets of tokens in order to win prizes. However, this does not translate well to an online context with interactive content.

Instead, the systems and methods discussed herein enable providing multi-part persistent content that may maintain a state across multiple presentations, including via different applications. In one such implementation, a first portion of a content item, such as a first level of a video game, may be provided to a client device, and the client device may interact with the game. An identification of a state of the game or completion of the first portion may be provided to a content server, which may store an association of the device or user with the execution state. At a subsequent time, a second portion of the content item, such as a second level of the game, may be provided to the client device, based on the stored association. This may allow content publishers to reach users with interactive content multiple times, enhancing engagement and reducing repetitive presentations. In some implementations in which the content item is a preview of an application or game, the state may be saved and transferred to the application or game on download. For example, after providing multiple levels of a game as previews to a client device over multiple sessions, if the user chooses to download the full game, the state may be transferred to the downloaded game such that the user may resume playback from a level that has been achieved during the previews.

FIGS. 1A and 1B are illustrations of an example of a multi-part persistent content item, according to some implementations. In some implementations as shown, a content item 102a-102b may be displayed as a pop-up window within an application 100a, 100b. As shown, applications 100a, 100b may be any type and form of application, and need not be the same application. For example, in one implementation, a first application may comprise a web browser, while a second application may comprise a media player. Although shown as a pop-up window, in many implementations, content items 102a, 102b may be provided via banners, interstitial content, pre-roll or post-roll content, within a frame on a web page or other application, or any other type and form of content presentation.

In the examples of FIGS. 1A and 1B, the content item 102a, 102b are successive levels of an interactive game. The game may be provided in separate portions, e.g. as a first portion corresponding to the first level, and second portion corresponding to the second level. This may reduce download and storage requirements, as only a portion of the game need be downloaded for each content item, rather than a full game. For complicated games, previews of applications, or media items such as television shows or movies, this may represent significant bandwidth and storage savings. For example, given a content item that is a half hour television program, short portions, such as successive 30 second clips, may be provided to a client device as multiple interstitial or pre- or post-roll content items. This may represent a 60:1 reduction in the amount of data to be downloaded while providing a user potentially enticing and engaging previews. Similar bandwidth and storage savings may be achieved with other content. For example, a single level of a game may be a few megabytes in size compared to several hundred for a full game.

As shown, in many implementations, a content item 102a, 102b may include links, buttons, or other elements enabling a user to download or purchase a corresponding content item (e.g. full application, television program, or other such content) or related content. In some implementations as shown, the content item 102a, 102b may also include a button to dismiss or skip the presentation of the portion of the content item (e.g. a skip button). In some implementations, a state of the content item when a user dismisses or skips the content item may be provided to a content provider. In some implementations, the dismissed state may indicate that the content provider may provide the same portion of the content item in response to a subsequent request for content from the client device rather than a subsequent portion; while in other implementations, the dismissed state may indicate that the content provider may provide a different content item entirely, for example if the user has no interest in the first content item.

In response to a dismissal or skip of a content item, and/or in response to completing a portion of a content item (e.g. completing a level, completing watching a video clip, utilizing an application preview for a predetermined time, etc.), a state of the content item may be provided to a content provider along with an identifier of the device or user. The state of the content item may be referred to variously as a completed portion, execution state, playback time, or by other such terms. In some implementations, the identification of the state of the content item may be granular (e.g. limited to the boundary of the portion of the content item, such as whether the user completed the level or the media segment), while in other implementations, the identification of the state of the content item may be continuous (e.g. a playback time within a media segment, a score achieved during playback of a game, a number of seconds of elapsed usage, etc.). The state of the content item may include other identifiers than time or progression through the content item, such as coins collected in a game. The state of the content item may be communicated to the content provider via any suitable means, such as via parameters in a RESTful request (e.g. HTTP POST or GET request including a parameter-value pair corresponding to the state), via a remote procedure call, or any other such means. In some implementations, an identification of a state may be included in any protocol layer of a network packet, such as in an options field of a transport control protocol header. This may reduce processing requirements to receive and interpret the packet or reduce the packet size (e.g. by not including an application layer header).

The client device may also provide an identifier of the device or user to the content provider to be stored in association with the execution state of the content item. The identifier may comprise a device identifier, user identifier, account name, or other such identifier. In some implementations, the identifier may comprise an authentication token received in response to an authentication request with an authentication server or content provider server (e.g. upon validation of user or device credentials).

FIG. 1C is an illustration of an example state association database or device-state database 120, according to some implementations. In some implementations, the database 120 may comprise a flat file, data array, relational database, or other such database, and may store an association between a user or device identifier 122, the multi-part content 124, and an execution state of the content 126. In the implementation shown, the identifiers may comprise alphanumeric or numeric strings, with states 126 representing predetermined states within the content item (e.g. completion of a level, points attained, seconds played, etc.). In other implementations, the database may include dynamically defined fields, such as XML data, and the state 126 may include a state definition (e.g. <score>1200</score>; <playback time (seconds)>30</playback time>; <level>2</level>; etc.).

In many implementations, user or device identifier 122, sometimes referred to as an authentication credential or authentication token, may comprise an alphanumeric hash value generated from device or user information. The hash value may be used to protect privacy and enhance security by not exposing any user or device information within the database 120. Similarly, in many implementations, content identifiers may comprise alphanumeric hash values, uniform resource identifiers (URIs) of content items, names of content items, and/or other information, such as type of content, genre, publisher, or other metadata. Although only three fields are shown in the example of FIG. 1C, in many implementations, many additional fields may be utilized to contain this or other metadata. Although labeled as a device identifier, in many implementations, the database entries may be associated with a user account or other identifier that is consistent across multiple devices (e.g. a user's desktop computer, smart phone, and tablet computer). Thus, a first portion of a multi-part content item may be provided via a first device of the user, and a second portion of the multi-part content item may be subsequently provided via a second device of the user.

As shown, in many implementations, a device identifier may be associated with multiple items of content and corresponding execution states. This may allow presentation of different multi-part content items in association with different applications or other content. For example, in one such implementation, a first multi-part content item comprising a video game may be presented as interstitial content between levels of another, related game application. A second multi-part content item comprising a television show may be presented as short post-roll media clips after episodes of another, similar television show. Both states may be maintained simultaneously, such that a user may first play the game application and receive a portion of the first multi-part content item; may then watch an episode of the television show and receive a portion of the second multi-part content item; and may then return to the game application and receive a second portion of the first multi-part content item. There thus need be no limit to the number of content items and states associated with any device and/or user.

FIG. 2 is a block diagram illustrating implementations of computing devices for use with multi-part persistent content. As shown, one or more client devices 250 may communicate with one or more content servers 252 via one or more networks 254 for exchanging state information and multi-part content items.

Client device(s) 250 may be referred to variously as a client, device, client device, computing device, user device, or any other such term, and may comprise any type and form of computing device, including a desktop computer, laptop computer, portable computer, tablet computer, wearable computer, embedded computer, smart television, console, Internet of Things (IoT) device or smart appliance, or any other type and form of computing device.

In many implementations, client device 250 includes a processor 200 and a memory 206. Memory 206 may store machine instructions that, when executed by processor 200 cause processor 200 to perform one or more of the operations described herein. Processor 200 may include a microprocessor, ASIC, FPGA, etc., or combinations thereof. In many implementations, processor 200 may be a multi-core processor or an array of processors. Memory 206 may include, but is not limited to, electronic, optical, magnetic, or any other storage devices capable of providing processor 200 with program instructions. Memory 206 may include a floppy disk, CD-ROM, DVD, magnetic disk, memory chip, ROM, RAM, EEPROM, EPROM, flash memory, optical media, or any other suitable memory from which processor 200 can read instructions. The instructions may include code from any suitable computer programming language such as, but not limited to, C, C++, C#, Java, JavaScript, Perl, HTML, XML, Python and Visual Basic.

Client device 250 may include one or more network interfaces 202. A network interface 202 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network. In many implementations, client device 250 may include a plurality of network interfaces 202 of different types, allowing for connections to a variety of networks, e.g. such as the Internet via different sub-networks.

Client device 250 may include one or more user interface devices 204. A user interface device 204 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 250, such as a built-in display, touch screen, microphone, etc., or external to the housing of client device 250, such as a monitor connected to client device 250, a speaker connected to client device 250, etc., according to various implementations.

Client device 250 may include in memory 206 one or more applications 100a, 100b, referred to generally as application(s) 100, or may execute an application 100 with a processor 200. Application 100 may be an application, applet, script, service, daemon, routine, or other executable logic for receiving content and displaying or otherwise outputting content via an output interface 204 of the client device (e.g. display, speaker, etc.). In some implementations, application 100 may be a web browser, mail client, video player, music player, video game, or any other such application. Application 100 may include functionality for displaying content received via network interface 202 and/or generated locally by processor 200. In some implementations, application 100 may be a media player or include an embedded media player, such as a plug-in or native media player within a web browser. Such applications 100 may include a command line interface, graphical user interface, or any combination of these or other interfaces.

Furthermore, in some implementations, an application 100 may comprise an agent executed in connection with a second application. For example, an application 100a may comprise a plug-in, daemon, subroutine, or other executable logic executed by a web browser application. In such implementations, the second application need not be configured to provide execution state information to a content server; rather, the first application or agent may provide such state information for multi-part content rendered within or by the second application.

Client device 250 may include or be identified with a user or device identifier 208. Device identifier 208 may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers. In some implementations, the device identifier 208 may be fixed to the device or preconfigured in the device, such as a manufacturer serial number or MAC address, while in other implementations, the device identifier 208 may be dynamically set by a content provider, streaming server, application 100, or other entity, such as a cookie or username. In some implementations, a unique or new device identifier 208 may be set for each communication to a content provider or authentication server 110, while in other implementations, the device identifier 208 may not be changed, or may be changed periodically (e.g. hourly, daily, weekly, etc.) or at other intervals (e.g. on restart of the client device, login to an internet service, etc.). In some implementations, a device identifier 208 may be associated with one or more other device identifiers 208 (e.g., a device identifier for a mobile device, a device identifier for a home computer, etc.). In many implementations, as discussed above, a device identifier 208 may be generated and/or transmitted to the device 250 by an authentication server. In other implementations, as discussed above, client 250 may request a device identifier from an authentication server 110, and may transmit the device identifier to the authentication server 110 in association with requests for content or application parameters.

Client device 250 may include user credentials 210. User credentials 210 may be any type and form of identifier or credentials, including a user name, password, account name, account identifier, pass phrase, biometric data such as a fingerprint, facial scan data, retinal information, or voiceprint, or any other type and form of user-specific information. In many implementations, the client device 250 may receive user credentials in response to display of a login prompt by an application 100 or an operating system of the client device 250. In some implementations, client device 250 may store user credentials temporarily, e.g. during execution of an application or for a predetermined time period. For example, in one such implementation, a user may execute a first application 100a and provide credentials to the application, which may be stored in memory 206 of the device. Subsequently, the user may utilize a second application 100b, and the second application 100b may retrieve the user credentials 210 from memory and provide the user credentials to an authentication server or content server 252. In many implementations, user credentials 210 may be encrypted, hashed, or otherwise obfuscated to protect user privacy and security. In many implementations, user credentials may be provided to a content server 252 via an authentication process: the user credentials, or a hash of the user credentials, may be provided to content server 252, which may match the hash or credentials to those in a database of the server; upon identifying a match, the content server 252 may determine the user or device is authorized or authentic, and may respond with an authorization token or other data indicating that the device is authorized. The device may utilize the authentication token with third party servers, applications, or other entities.

A client device 250 may communicate with a content server 252 via one or more networks 254. The networks 254 may comprise any type and form of network, including local area networks (LANs), wide area networks (WANs) such as the Internet, satellite networks, cable networks, broadband networks, fiber optic networks, microwave networks, cellular networks, wireless networks, or any combination of these or other such networks. The networks 254 may be the same type of network or different types, and may include a plurality of additional devices (not illustrated), including gateways, modems, firewalls, routers, switches, etc. The networks 254 may also include any number of computing devices (e.g., computer, servers, routers, network switches, etc.) that are configured to receive and/or transmit data within the network. The networks 254 may further include any number of hardwired and/or wireless connections. A client device 250 may communicate wirelessly (e.g., via WiFi, cellular, radio, etc.) with a transceiver that is hardwired (e.g., via a fiber optic cable, a CAT5 cable, etc.) to other computing devices in the network. In some implementations, a network 254 may be a virtual network, such as a virtual network between a plurality of virtual machines executed by a single physical machine, or an abstract network such as an offline transfer of data via physically movable media (e.g. a Sneakernet, transferring data via tape media, CD-ROM, flash media, external hard drives, floppy disks, etc.).

Also illustrated in FIG. 2 is a block diagram of an implementation of an content server 252. As with client devices 250, content server 252 may include one or more processors 200, memories or storage devices 206, network interfaces 202, and user interfaces 204. In some implementations referred to as headless servers, a content server 252 may not include a user interface 204, but may communicate with clients 250 or other devices with user interfaces 204 via a network 254. In some implementations, memory 206 may store one or more applications for execution by processor 200 of the server, including FTP servers, web servers, mail servers, file sharing servers, peer to peer servers, or other such applications for delivering content or redirection commands to allow clients to access content at a content provider. Content server 252 may comprise any type and form of computing device, including desktop computers, servers, workstations, laptop computers, portable computers, embedded computers, or any other type and form of computing device. In many implementations, content server 252 may comprise one or more virtual machines executed by one or more physical computing devices, and may be configured as a server farm, cluster, or cloud of devices.

Content server 252 may include content storage 212 storing one or more content items 102*a*, 102*b*, referred to generally as content item(s) 102 for retrieval and installation by client devices 250. Content items 102 may be identified via a URI or URL or other application identifier as discussed above, and may be compressed, encrypted, or otherwise packaged for download and execution. In many implementations, a content item 102 may have multiple parts or portions, or be divided into a plurality of associated content items 102 (e.g. multiple media segments, multiple levels of a game, etc.). Content items 102 may have an explicit order of presentation in many implementations (e.g. level 2 comes after level 1, level 3 comes after level 2; or a first media clip is followed by a second media clip, etc.). This presentation order may be noted in metadata of the content items, or in a separate playlist or manifest.

Content server 252 may comprise or execute a content selector 214. Content selector 214 may comprise an application, server, service, daemon, routine, or other executable logic for receiving authentication credentials or tokens from a client device 250, and for selecting portions of multi-part content items 102 associated with the user credentials and content items in a device-state database 120. As discussed above, device-state database 120 may comprise any type and form of data storage, including a database, flat file, relational database, array, or other structure capable of associating a device identifier 208 or user identifier (e.g. identifier 122) with a content item 102 and state 126. In many implementations, each entry or association may be further associated with an expiration time or duration. Upon expiration of the duration or expiration time, the corresponding association or entry may be removed, allowing states of multi-part content to 'time out' or expire.

Figure 3:
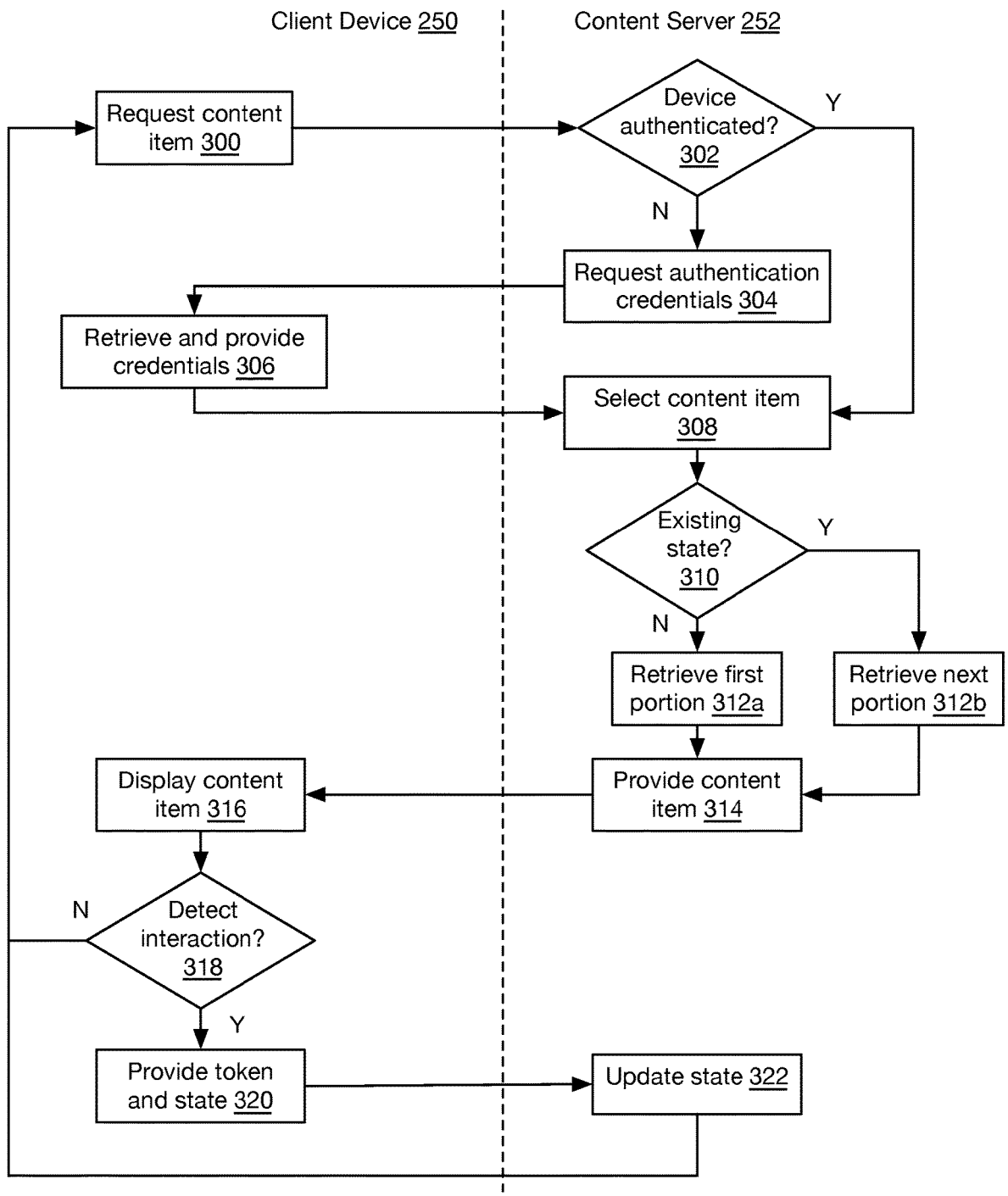
FIG. 3 is a flow chart illustrating an implementation of a method for providing multi-part persistent content.

FIG. 3 is a flow chart illustrating an implementation of a method for providing multi-part persistent content. At step 300, a client device 250 may request an item of content from content server 252. In many implementations, the request for an item of content may not specify a multi-part item of content; the content server may respond with a multi-part item of content or a single-part item of content, based on, for example, whether the client device can be authenticated or if the client device does not provide valid credentials. Accordingly, the request may not specify any particular parameters for the item of content in many implementations. In many implementations, e.g. if the device has been previously authenticated, the client device may provide an authentication token to the content server 252, either with the request or in response to a subsequent request for an authentication token.

At step 302, the content server 252 may determine if the device has been authenticated. In some implementations, as discussed above, the content server may receive an authentication token with the request. If the token is valid, then the content server may skip to step 308 and select a content item. If the token is not valid, then in some implementations, the content server may transmit a request for authentication credentials at step 304. The client device may retrieve and provide an authentication token at step 306, or retrieve and provide credentials to be authenticated by the content server or an authentication server (and receive an authentication token in turn). Retrieving authentication credentials may comprise retrieving previously entered credentials, or receiving credentials from a user (e.g. a user name and password, biometric data, etc.). In some implementations, as discussed above, if the device is not authenticated or cannot be authenticated, then the content server may select a single-part content item for delivery (not illustrated).

Once the device is authenticated and/or an authentication token has been received or transmitted to the client device, at step 308, the content server may select a multi-part content item for delivery. The multi-part content item may be selected via any means, such as based on other content being viewed by or requested by the client (e.g. a web page from which the content is requested, such as via a referrer tag; a media item previously played back (for post-roll content) or requested for playback (for pre-roll content); a search request; etc.). Content may be selected based on any type and form of information, including information about the user, information about the client device, information about an application being used or media being viewed, or any other type and form of information.

At step 310, the content server 252 may determine whether a device-state association exists in a device-state database of the content server 252 for the authentication token and associated device or user. In some implementations, the content server 252 may look up the association via the content item as an index, while in other implementations, the content server 252 may look up the association via the device or user identifier or authentication token as an index. If no state is identified in the database, or if a state indicating that none of the portions of the content item have been completed exists, then at step 312a, a first portion of the item of content may be retrieved or selected for delivery. If a state is identified in the database, then at step 312b, the content server may select a subsequent portion of the item of content for delivery.

At step 314, the content server 252 may provide the selected portion of the multi-part content item for delivery. In some implementations, providing the selected portion may comprise transmitting a redirect responsive to the client device including an address of the selected portion of the content item; while in other implementations, providing the selected portion may comprise transmitting the portion of the content item in response to the request for content of step 300. In some implementations, the portion of the content item may be compressed or encrypted for transmission. In some implementations, the transmission of the content item may include one or more state identifiers or parameters (e.g. a score within a game, a playback start time within the portion, or other such parameters) to allow the client device to resume presentation of the content item in the same state as a previously ended presentation of the content item.

At step 316, the client device 250 may display or render the received portion of the content item. Displaying or rendering the portion of the content item may comprise generating a window or frame in which to display the content, executing code of the content item, decoding or rendering media of the content item, or other such functions. In some implementations, displaying or rendering the portion of the content item may comprise setting parameters for variables of the content item according to received state information (e.g. a score or playback start time). As discussed above, in many implementations, displaying the content item may comprise displaying the content item within an application from which the request for content was generated at step 300. The application may be a different application than that which requested and rendered previous portion(s) of the content item.

At step 318, in some implementations, the client device 250 or application may determine whether a user of the client device has interacted with the displayed or rendered portion of the content item. Interactions may include playing a game, entering text or data into an application preview, or taking other such actions. In some implementations, an interaction of the user with the content may be inferred by a user not selecting a skip or end button. For example, in some implementations, the absence of detection of any interaction with a skip or end button may indicate that the user interacted with or viewed the content item; and such absence of skip commands may be treated as a detected interaction. In some implementations, if interaction is detected or if the presentation is not skipped or ended prematurely, then at step 320, the client device may provide an authentication token and execution state of the content item (e.g. completed a level or media item, achieved a new score, etc.) to the content server 252. At step 322, the content server may update the device-state association in the database according to the received state information. If the content is not interacted with within a predetermined time (or if a skip or end button is selected), in some implementations, the method may return to step 300 and no updated state information may be provided to the content server 252, allowing the content server to re-select the same content portion in response to a subsequent request for content. In other implementations, state information may be provided indicating that the user did not interact with the content (e.g. the same or corresponding state information as received from the content server at step 316).

In some implementations, if the execution state information indicates that the presentation of all portions of the multi-part content is complete (e.g. all portions of a media item have been fully displayed, or a user has completed all levels of a game preview, or spent a predetermined period of time in total using an application preview), then a second content item may be provided to the client device for display to the user and/or use by an application. Accordingly, the systems and methods discussed herein provide for multi-part content to be presented on client devices, with execution states maintained across multiple applications and/or sessions. This enables deeper interactivity and enhanced user experience, with lower bandwidth and storage requirements than delivering larger versions of content.

In one aspect, the present application is directed to a method for providing multi-part persistent content. The method includes requesting, by a client device from a content server, a content item. The method also includes receiving, by the client device from the content server, a first portion of a multi-part content item, the first portion of the multi-part content item displayed to a user of the client device. The method also includes providing, by the client device to the content server, an authentication token and an identification of a state of execution of the multi-part content item, the content server storing the authentication token in association with the state of execution of the multi-part content item. The method also includes subsequently requesting, by the client device from the content server, a second content item, the request comprising the authentication token. The method also includes receiving, by the client device from the content server, a second portion of the multi-part content item, the second portion of the multi-part content item displayed to the user of the client device, the second portion selected by the content server responsive to retrieval of the association between the authentication token and the state of execution of the multi-part content item.

In some implementations, the multi-part content item comprises a game, and wherein the first portion and second portion each comprise a different level of the game. In some implementations, the state of execution of the multi-part content item indicates completion of the first portion of the multi-part content item. In some implementations, receiving the first portion of the multi-part content item includes receiving an authentication credential, by the client device from a user of the device; transmitting the authentication credential, by the client device to the content server; and receiving the authentication token, by the client device from the content server, responsive to validation of the authentication credential by the content server.

In some implementations, the method includes providing, by the client device to the content server, the authentication token and a second identification of a state of execution of the multi-part content item, the content server storing the authentication token in association with the second state of execution of the multi-part content item; and receiving, by the client device from the content server, a second content item, responsive to a determination by the content server that the second identification of the state of execution of the multi-part content item indicates that execution of the multi-part content item is complete. In a further implementation, the second content item comprises a reward for successful completion of the multi-part content item, the reward usable by an application executed by the client device.

In some implementations, the authentication token comprises a device identifier. In some implementations, the first portion of the multi-part content item is displayed via a first application executed by the client device; and wherein the second portion of the multi-part content item is displayed via a different second application executed by the client device.

In another aspect, the present disclosure is directed to a method for providing multi-part persistent content. The method includes receiving, by a content server from a client device, a request for a content item. The method also includes providing, by the content server to the client device, a first portion of a multi-part content item, the first portion of the multi-part content item displayed to a user of the client device. The method also includes receiving, by the content server from the client device, an authentication token and an identification of a state of execution of the multi-part content item. The method also includes storing, by the content server, the authentication token in association with the state of execution of the multi-part content item. The method also includes subsequently receiving, by the content server from the client device, a request for a second content item, the request comprising the authentication token. The method also includes selecting, by the content server, a second portion of the multi-part content item responsive to the association between the authentication token and the state of execution of the multi-part content item. The method also includes providing, by the content server to the client device, a second portion of the multi-part content item, the second portion of the multi-part content item displayed to the user of the client device.

In some implementations, the multi-part content item comprises a game, and wherein the first portion and second portion each comprise a different level of the game. In some implementations, the state of execution of the multi-part content item indicates completion of the first portion of the multi-part content item.

In some implementations, providing the first portion of the multi-part content item includes receiving an authentication credential from the client device; validating the authentication credential; and transmitting the authentication token to the client device. In some implementations, the method includes receiving, by the content server from the client device, the authentication token and a second identification of a state of execution of the multi-part content item; storing, by the content server, the authentication token in association with the second state of execution of the multi-part content item; determining, by the content server, the second identification of the state of execution of the multi-part content item indicates that execution of the multi-part content item is complete; and responsive to the determination, providing, by the content server to the client device, a second content item. In a further implementation, the second content item comprises a reward for successful completion of the multi-part content item, the reward usable by an application executed by the client device.

In some implementations, the authentication token comprises a device identifier. In some implementations, the first portion of the multi-part content item is displayed via a first application executed by the client device; and the second portion of the multi-part content item is displayed via a different second application executed by the client device.

In another aspect, the present disclosure is directed to a system for providing multi-part persistent content. The system includes a client device comprising a network interface in communication with a content server and a processor executing a first application. The first application is configured to request, from the content server, a content item; and receive, from the content server, a first portion of a multi-part content item, the first portion of the multi-part content item displayed to a user of the client device. The first application is also configured to provide, to the content server, an authentication token and an identification of a state of execution of the multi-part content item, the content server storing the authentication token in association with the state of execution of the multi-part content item. The first application is also configured to subsequently request, from the content server, a second content item, the request comprising the authentication token. The first application is also configured to receive, from the content server, a second portion of the multi-part content item, the second portion of the multi-part content item displayed to the user of the client device, the second portion selected by the content server responsive to retrieval of the association between the authentication token and the state of execution of the multi-part content item.

In some implementations, the multi-part content item comprises a game, and wherein the first portion and second portion each comprise a different level of the game. In some implementations, the state of execution of the multi-part content item indicates completion of the first portion of the multi-part content item. In some implementations, the first application is further configured to: provide, to the content server, the authentication token and a second identification of a state of execution of the multi-part content item, the content server storing the authentication token in association with the second state of execution of the multi-part content item; and receive, from the content server, a second content item, responsive to a determination by the content server that the second identification of the state of execution of the multi-part content item indicates that execution of the multi-part content item is complete.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed:

1. A method for providing multi-part persistent content, comprising:
   requesting, by a client device from a content server, a content item;
   receiving, by the client device from the content server, a first portion of a multi-part content item, the first portion of the multi-part content item displayed to a user of the client device;
   providing, by the client device to the content server, an authentication token and an identification of a state of execution of the multi-part content item, the content server storing the authentication token in association with the state of execution of the multi-part content item;
   subsequently requesting, by the client device from the content server, a second content item, the request comprising the authentication token; and
   receiving, by the client device from the content server, a second portion of the multi-part content item, the second portion of the multi-part content item displayed to the user of the client device, the second portion selected by the content server responsive to retrieval of the association between the authentication token and the state of execution of the multi-part content item.

2. The method of claim 1, wherein the multi-part content item comprises a game, and wherein the first portion and second portion each comprise a different level of the game.

3. The method of claim 1, wherein the state of execution of the multi-part content item indicates completion of the first portion of the multi-part content item.

4. The method of claim 1, wherein receiving the first portion of the multi-part content item further comprises:
   receiving an authentication credential, by the client device from a user of the device;
   transmitting the authentication credential, by the client device to the content server; and
   receiving the authentication token, by the client device from the content server, responsive to validation of the authentication credential by the content server.

5. The method of claim 1, further comprising:
   providing, by the client device to the content server, the authentication token and a second identification of a state of execution of the multi-part content item, the content server storing the authentication token in association with the second state of execution of the multi-part content item; and
   receiving, by the client device from the content server, a second content item, responsive to a determination by the content server that the second identification of the state of execution of the multi-part content item indicates that execution of the multi-part content item is complete.

6. The method of claim 5, wherein the second content item comprises a reward for successful completion of the multi-part content item, the reward usable by an application executed by the client device.

7. The method of claim 1, wherein the authentication token comprises a device identifier.

8. The method of claim 1, wherein the first portion of the multi-part content item is displayed via a first application executed by the client device; and wherein the second portion of the multi-part content item is displayed via a different second application executed by the client device.

9. A method for providing multi-part persistent content, comprising:
   receiving, by a content server from a client device, a request for a content item;
   providing, by the content server to the client device, a first portion of a multi-part content item, the first portion of the multi-part content item displayed to a user of the client device;
   receiving, by the content server from the client device, an authentication token and an identification of a state of execution of the multi-part content item;
   storing, by the content server, the authentication token in association with the state of execution of the multi-part content item;
   subsequently receiving, by the content server from the client device, a request for a second content item, the request comprising the authentication token;
   selecting, by the content server, a second portion of the multi-part content item responsive to the association between the authentication token and the state of execution of the multi-part content item; and
   providing, by the content server to the client device, a second portion of the multi-part content item, the second portion of the multi-part content item displayed to the user of the client device.

10. The method of claim 9, wherein the multi-part content item comprises a game, and wherein the first portion and second portion each comprise a different level of the game.

11. The method of claim 9, wherein the state of execution of the multi-part content item indicates completion of the first portion of the multi-part content item.

12. The method of claim 9, wherein providing the first portion of the multi-part content item further comprises:
receiving an authentication credential from the client device;
validating the authentication credential; and
transmitting the authentication token to the client device.

13. The method of claim 9, further comprising:
receiving, by the content server from the client device, the authentication token and a second identification of a state of execution of the multi-part content item;
storing, by the content server, the authentication token in association with the second state of execution of the multi-part content item;
determining, by the content server, the second identification of the state of execution of the multi-part content item indicates that execution of the multi-part content item is complete; and
responsive to the determination, providing, by the content server to the client device, a second content item.

14. The method of claim 13, wherein the second content item comprises a reward for successful completion of the multi-part content item, the reward usable by an application executed by the client device.

15. The method of claim 9, wherein the authentication token comprises a device identifier.

16. The method of claim 9, wherein the first portion of the multi-part content item is displayed via a first application executed by the client device; and wherein the second portion of the multi-part content item is displayed via a different second application executed by the client device.

17. A system for providing multi-part persistent content, comprising:
a client device comprising a network interface in communication with a content server and a processor executing a first application configured to:
request, from the content server, a content item,
receive, from the content server, a first portion of a multi-part content item, the first portion of the multi-part content item displayed to a user of the client device,
provide, to the content server, an authentication token and an identification of a state of execution of the multi-part content item, the content server storing the authentication token in association with the state of execution of the multi-part content item,
subsequently request, from the content server, a second content item, the request comprising the authentication token, and
receive, from the content server, a second portion of the multi-part content item, the second portion of the multi-part content item displayed to the user of the client device, the second portion selected by the content server responsive to retrieval of the association between the authentication token and the state of execution of the multi-part content item.

18. The system of claim 17, wherein the multi-part content item comprises a game, and wherein the first portion and second portion each comprise a different level of the game.

19. The system of claim 17, wherein the state of execution of the multi-part content item indicates completion of the first portion of the multi-part content item.

20. The system of claim 17, wherein the first application is further configured to:
provide, to the content server, the authentication token and a second identification of a state of execution of the multi-part content item, the content server storing the authentication token in association with the second state of execution of the multi-part content item; and
receive, from the content server, a second content item, responsive to a determination by the content server that the second identification of the state of execution of the multi-part content item indicates that execution of the multi-part content item is complete.

* * * * *